US012073136B2

(12) United States Patent
Matsuo

(10) Patent No.: US 12,073,136 B2
(45) Date of Patent: Aug. 27, 2024

(54) INDUSTRIAL PRINTING SYSTEM, PRINT SERVER, AND GROUPING PROCESS METHOD FOR PEER-TO-PEER GROUPING OF PRODUCTION PRINTING JOBS

(71) Applicant: KYOCERA Document Solutions Inc., Osaka (JP)

(72) Inventor: Taku Matsuo, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/967,718

(22) Filed: Oct. 17, 2022

(65) Prior Publication Data

US 2024/0126492 A1 Apr. 18, 2024

(51) Int. Cl.
*G06F 3/12* (2006.01)

(52) U.S. Cl.
CPC .......... *G06F 3/1262* (2013.01); *G06F 3/1205* (2013.01); *G06F 3/1243* (2013.01); *G06F 3/1282* (2013.01); *G06F 3/1285* (2013.01)

(58) Field of Classification Search
CPC .... G06F 3/1262; G06F 3/1205; G06F 3/1243; G06F 3/1282; G06F 3/1285
See application file for complete search history.

(56) References Cited

U.S. PATENT DOCUMENTS

| | | | |
|---|---|---|---|
| 11,474,761 B1 * | 10/2022 | Morales | G06F 3/125 |
| 2004/0170460 A1 * | 9/2004 | Mokuya | G06F 3/1291 400/76 |
| 2008/0079980 A1 * | 4/2008 | Matsubara | G03G 15/5012 358/1.14 |
| 2008/0080006 A1 * | 4/2008 | Paskalev | G06F 3/1219 358/1.18 |
| 2014/0373103 A1 * | 12/2014 | Hirata | G06F 21/31 726/4 |
| 2015/0156351 A1 | 6/2015 | Yamamoto | |
| 2017/0195506 A1 * | 7/2017 | Kato | H04N 1/32523 |
| 2018/0260165 A1 * | 9/2018 | Mori | G06F 3/1222 |
| 2018/0321888 A1 * | 11/2018 | Rosemann | G06F 3/1248 |
| 2019/0163422 A1 * | 5/2019 | Matsuo | G06F 3/1262 |
| 2019/0250865 A1 * | 8/2019 | Takigawa | G06F 3/127 |
| 2021/0187555 A1 * | 6/2021 | Ashworth | B07C 3/18 |
| 2022/0283754 A1 * | 9/2022 | Nishide | G06F 3/1215 |

(Continued)

FOREIGN PATENT DOCUMENTS

JP 2015-107555 A 6/2015

*Primary Examiner* — Helen Zong
(74) *Attorney, Agent, or Firm* — Hawall Patent Services; Nathaniel K. Fedde; Kenton N. Fedde

(57) ABSTRACT

Provided is an industrial printing system for peer-to-peer grouping of production prints. The industrial printing system performs production printing with a plurality of servers that perform distributed processing of jobs. Each of the plurality of print servers includes a condition setting unit, a condition sharing unit, a job acquiring unit, and a job processing unit. The condition setting unit sets a grouping condition for grouping the jobs. The condition sharing unit shares the grouping condition set by the condition setting unit with other print server. The job acquiring unit acquires a plurality of jobs that meets the grouping condition from the other print server. The job processing unit groups and processes the plurality of jobs acquired by the job acquiring unit.

20 Claims, 5 Drawing Sheets

(56) References Cited

U.S. PATENT DOCUMENTS

| | | | |
|---|---|---|---|
| 2023/0085689 A1* | 3/2023 | Togashi | G06F 3/1234 358/1.15 |
| 2023/0088527 A1* | 3/2023 | Li | G06F 3/1274 358/1.14 |
| 2023/0107758 A1* | 4/2023 | Nishide | G06F 3/126 358/1.15 |
| 2023/0129677 A1* | 4/2023 | Ohkawa | G06F 3/1285 358/1.14 |

* cited by examiner

INDUSTRIAL PRINTING SYSTEM, PRINT SERVER, AND GROUPING PROCESS METHOD FOR PEER-TO-PEER GROUPING OF PRODUCTION PRINTING JOBS

BACKGROUND

The present disclosure relates to an industrial printing system, a print server, and a grouping process method with distributed processing, particularly for industrial printing (production printing).

Among print systems that typically include a plurality of printers, there is a print systems that performs so-called ubiquitous printing. In this system, when the print system including a plurality of printers (MFPs) receives a ubiquitous job from a PC that issued the job, the first MFP stores the job in memory if the print settings can be processed by its own print function, and if it cannot be processed, it is transferred to the next MFP. This processing is performed according to the predetermined order from the first MFP to the Nth MFP. This saves the ubiquitous job in the memory of the MFP that can process it. As a result, in this printing system, it is possible to reduce the waiting time until the user obtains the printed matter.

On the other hand, in industrial printing called production printing, which uses a commercial (industrial) printing apparatus, the components of the final product are produced by dividing the work into a plurality of processes. For example, in the case of bookbinding, the components such as a cover, a body (color), a body (black and white), a promotional item, a band, a shipping envelope, or the like, are processed as different jobs. Then, in the middle of the process, each job is combined and finished as a book as the final product.

In the production printing, in order to efficiently process a large number of print jobs, grouping is sometimes performed to collectively process a plurality of jobs such as the same print instruction. With the grouping, a setting change can be minimized during printing, such as changing a set of paper, or the like, so that the printing work can be made more efficient.

SUMMARY

An industrial printing system of the present disclosure is an industrial printing system for production printing having a plurality of print servers that performs distributed processing of jobs, each of the plurality of print servers including: a condition setting unit that sets a grouping condition for grouping the jobs; a condition sharing unit that shares the grouping condition set by the condition setting unit with other print server; a job acquiring unit that acquires a plurality of jobs that meets the grouping condition from the other print server; and a job processing unit that groups and processes the plurality of jobs acquired by the job acquiring unit.

A print server of the present disclosure is a print server that performs distributed processing of jobs in an industrial printing system for production printing, including: a condition setting unit that sets a grouping condition for grouping the jobs; a condition sharing unit that shares the grouping condition set by the condition setting unit with other print server; a job acquiring unit that acquire a plurality of jobs that meets the grouping condition from the other print server; and a job processing unit that groups and processes the plurality of jobs acquired by the job acquiring unit.

A grouping process method of the present disclosure is a grouping process method performed by an industrial printing system for production printing, having a plurality of print servers for distributed processing of jobs, including the steps of: setting a grouping condition for grouping the jobs; sharing the set grouping condition with other print server; acquiring a plurality of jobs that meets the grouping condition from the other print server; and grouping and processing the acquired plurality of jobs.

DETAILED DESCRIPTION

Embodiment

[Configuration of Industrial Printing System X]

Figure 1:
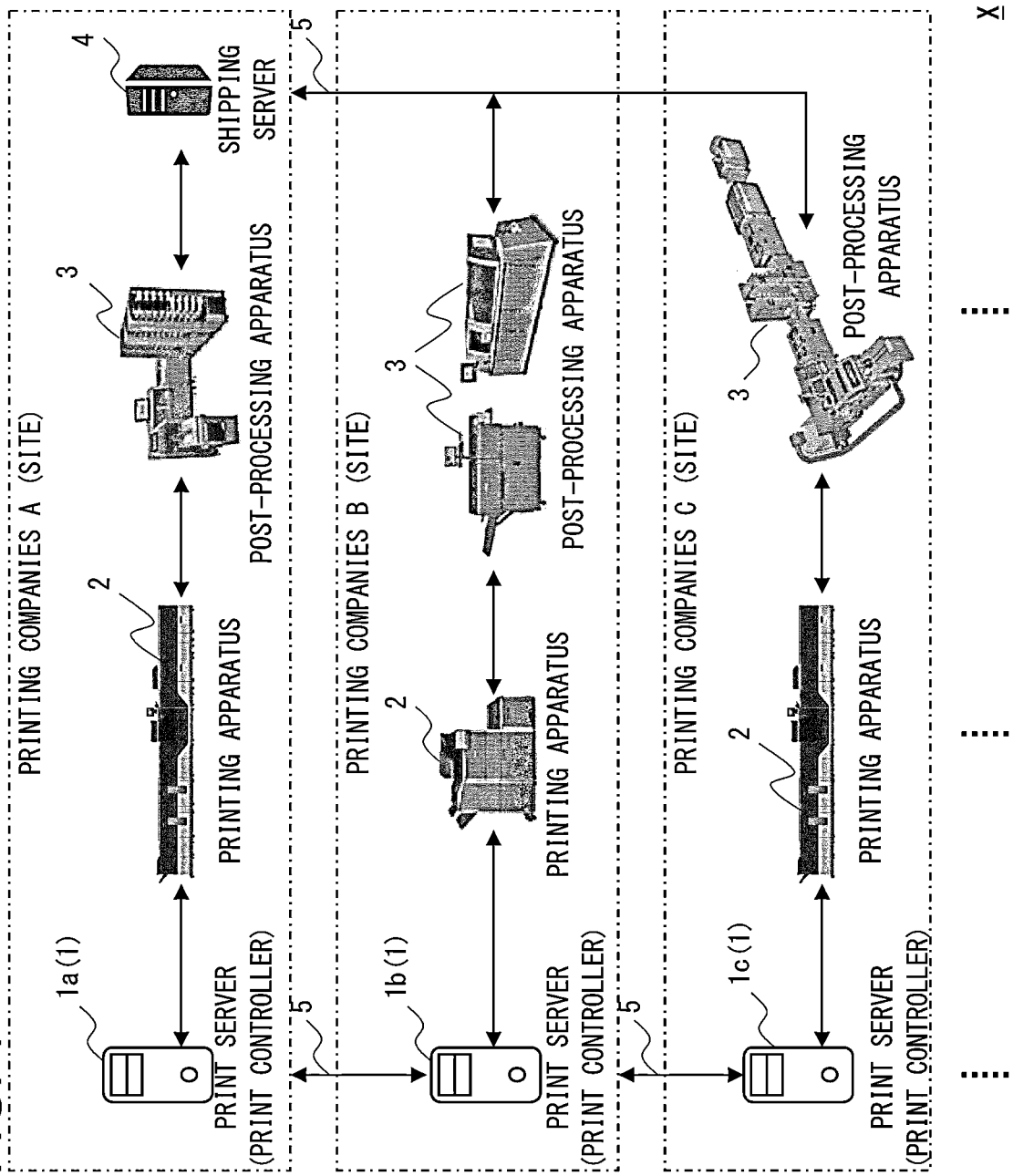
FIG. 1 is an example of a system configuration diagram of an industrial printing system according to an embodiment of the present disclosure.

Firstly, with reference to FIG. 1, an example of the overall system configuration of the industrial printing system X according to the present embodiment is described.

The industrial printing system X according to the present embodiment is a system that executes output in a printing process and a post-processing process (hereinafter also simply referred to as "printing") in industrial printing (production printing).

Figure 3:
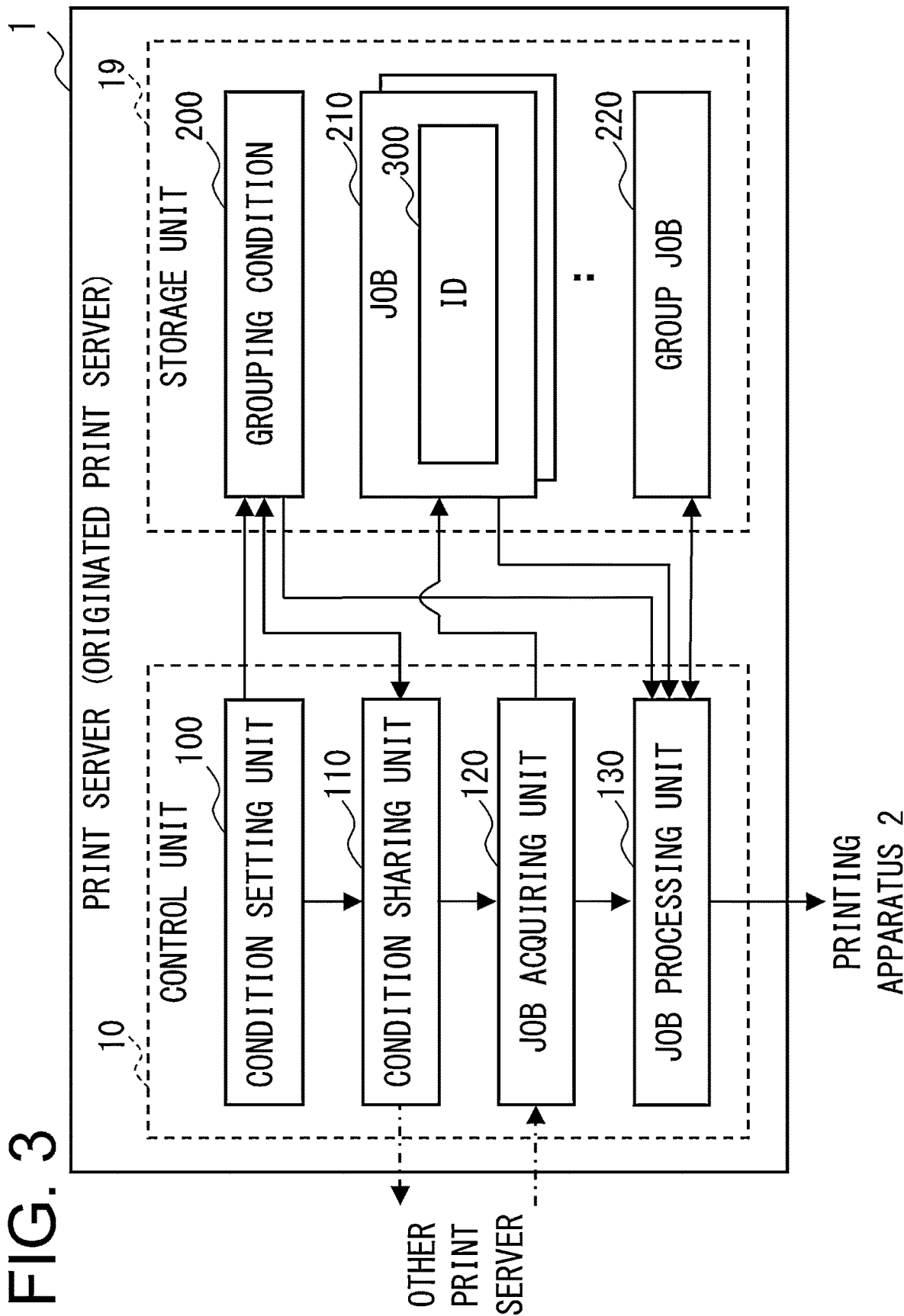
FIG. 3 is a block diagram showing the functional configuration of the print server as shown in FIG. 1.

Here, in the industrial printing system X according to the present embodiment, a final product such as a book, or the like, to be output is an "order", and each component of the order has a job 210 (FIG. 3).

In the industrial printing system X, sites such as printing companies and printing factories are connected by a network 5 and cooperated. Each site includes a print server 1, a printing apparatus 2, a post-processing apparatus 3, a shipping server 4, and the like.

In FIG. 1, as an example of the inter-site cooperation that print servers 1a, 1b, 1c, . . . of printing companies A, B, C, . . . and a shipping server 4 of a printing company A is connected via a network 5 is shown.

Hereinafter, any one of these print servers 1a, 1b, 1c, . . . is simply referred to as the print server 1.

The print server 1 is information processing apparatus that serves as a print controller to manage and control printing-related apparatus such as the printing apparatus 2, the post-processing apparatus 3, the shipping server 4, and the like, provided at each site (hereinafter referred to as a "component apparatus"). The print server 1 is configured as a PC (Personal Computer) server, an FC (Factory Computer), a dedicated apparatus, a general-purpose apparatus, and the like. In the present embodiment, the print server 1 performs peer-to-peer distributed processing of the job 210 (FIG. 3) for production printing by executing dedicated print management application software (hereinafter simply referred to as an "application"). The print management application (hereinafter referred to as a "dedicated application") may run on a common platform performing print design creation, user management, tenant management, security management, maintenance notification service, prepress processing management, storage management of each document, and management of the printing apparatus 2, or the like.

Specifically, in the production printing, the print server 1 transmits and receives various instructions and information to and from the printing apparatus 2, the post-processing apparatus 3, the shipping server 4, and the like. As a result, the print server 1 performs transmission and reception for managing the status of each apparatus and grouping the jobs 210.

In the present embodiment, the distributed processing is performed between a print server 1 serving as a job collecting side (receiving side of the job 210) that performs grouping process (hereinafter referred to as the "originated print server") and a print server 1 that is the job transmission side (hereinafter referred to as the "other print server"). Specifically, at least some of the jobs 210 are transmitted and received between the originated print server and the other print server(s) for grouping.

The printing apparatus 2 is an industrial printer that performs digital printing for small-lot, an automated offset printing apparatus that performs offset printing for large-volume (multiple-lot), or the like, and it executes the processing of the printing process.

The printing apparatus 2 at each site according to the present embodiment may differ in size, paper quality, color profile, recordable range, or the like, of recording paper used in the printing process.

The post-processing apparatus 3 is various apparatuses for executing post-processing processes such as folding, collating, cutting, bookbinding, or the like, of the recording paper printed by the printing apparatus 2.

The post-processing apparatus 3 at each site according to the present embodiment may also differ in the contents and range or the like of processes that can be executed in the post-processing process.

The shipping server 4 is a server that manages the shipping of orders sent from each site after the printing process or post-processing process is completed. In the present embodiment, although an example by using the shipping server 4 at the site of company A is described, the shipping server 4 may be provided at the other site(s).

In the present embodiment, the shipping server 4 also manages, for example, the group job 220 that is grouped and printed and then sent to each site after being cut.

The network 5 is a LAN (Local Area Network), a wireless LAN (Wi-Fi), a WAN (Wide Area Network), a mobile telephone network, an industrial network, a voice telephone network, other dedicated lines, or the like. The network 5 can transmit and receive various commands and data to and from each apparatus. Further, the print server 1 and each component apparatus may also be connected via a LAN, or the like, of the network 5. In addition, the network 5 may be configured with a VPN (Virtual Private Network), or the like.

In addition, a plurality of these apparatuses may exist according to the application, the scale of printing, and the like. Each apparatus can be connected to the print server 1 by various protocols via the network 5. Alternatively, the print server 1 and each apparatus may be directly connected by wire by using various interfaces.

In addition, each site may have the other component apparatus managed by the print server 1. The other component apparatus includes, for example, a terminal for manuscript submission, a terminal for design proofreading, a prepress apparatus, or the like.

In addition, an administrator terminal, a console, or the like, used by an administrator or a user may be connected via the network 5 from inside and outside of each site. Also, each print server 1 can be accessed by the administrator or the user by using a web browser, a terminal, a dedicated application, or the like, on the administrator terminal, the console, or the like. As a result, it is possible to set the grouping condition 200 (FIG. 3), design the printing, submit the document, manage the prepress process, check the progress status, request the process, and the like.

[Control Configuration of Print Server 1]

Figure 2:
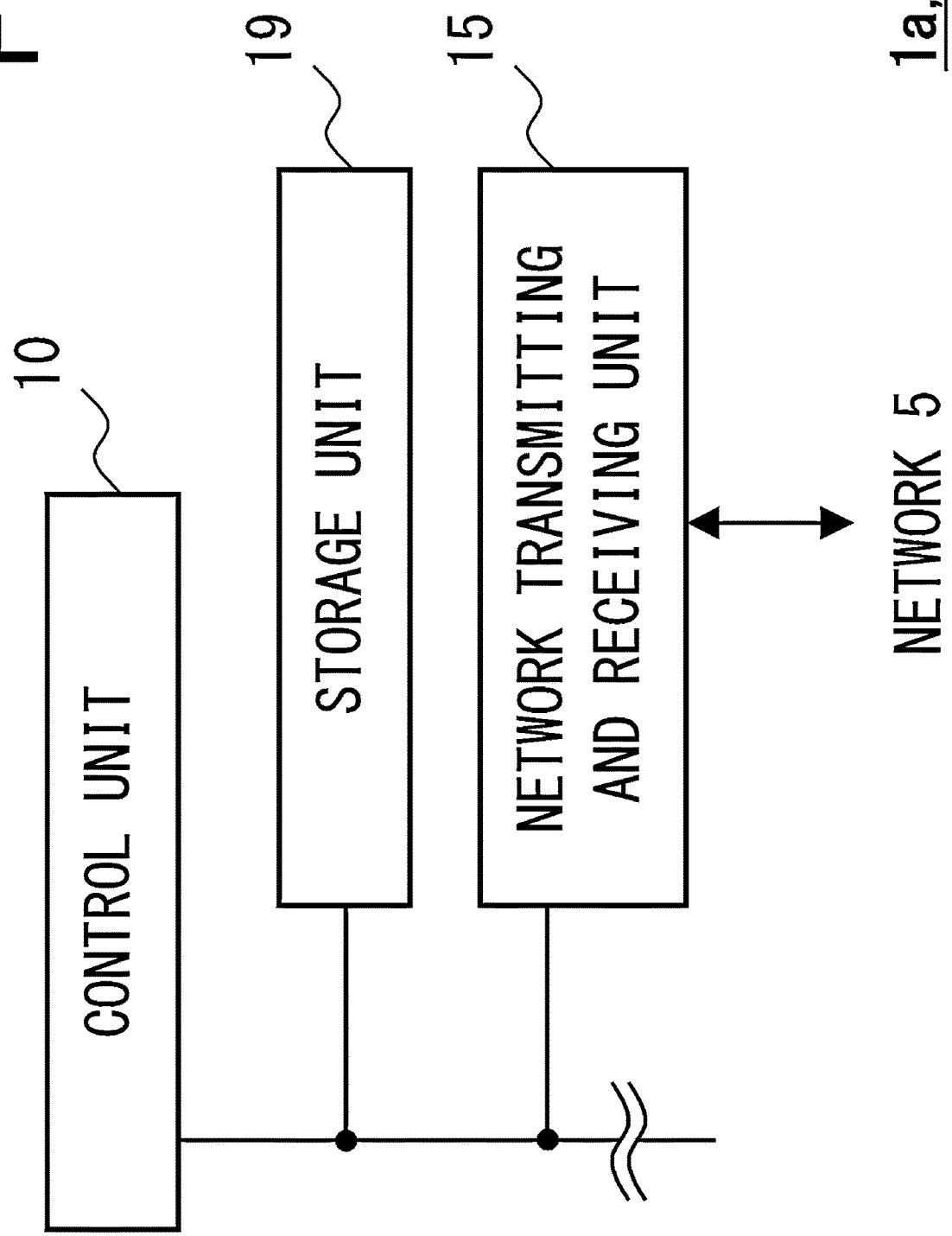
FIG. 2 is a block diagram showing the control configuration of the print server as shown in FIG. 1.

Next, with referring to FIG. 2, the control configuration of the print server 1 is described.

The print server 1 includes a control unit 10, a network transmitting and receiving unit 15, a storage unit 19, and the like. Each unit is connected to the control unit 10 and controlled in operation by the control unit 10.

The control unit 10 is an information processing unit such as GPP (General Purpose Processor), CPU (Central Processing Unit), MPU (Micro Processing Unit), DSP (Digital Signal Processor), GPU (Graphics Processing Unit), ASIC (Application Specific Integrated Circuit, or Application-specific processors), or the like.

The control unit 10 reads the control program stored in the ROM or HDD of the storage unit 19, expands the control program in the RAM, and executes it, thereby operating as each unit of the function blocks as described later. Further, the control unit 10 controls the entire apparatus according to instruction information input from the administrator terminal or the console.

The network transmitting and receiving unit 15 is a network connection unit including a LAN board, a wireless transmitting and receiving apparatus, or the like, for connecting to the external network 5.

The network transmitting and receiving unit 15 transmits and receives data via a data communication line, and it transmits and receives voice signals via a voice telephone line.

storage unit 19 is a non-transitory recording medium of semiconductor memory such as ROM (Read Only Memory) or RAM (Random Access Memory), or HDD (Hard Disk Drive), or the like.

The control program for controlling the operation of the print server 1 is stored in the ROM or HDD of the storage unit 19.

The control program includes an OS (Operating System), middleware on the OS, a service (a daemon), various application(s), data of database, and the like. Among these, the various application(s) include the dedicated application as described above. Furthermore, the storage unit 19 may also store account settings for users and administrators of the industrial printing system X, other data, and the like.

In addition, in the print server 1, the control unit 10 is integrally formed, such as a CPU with built-in GPU, chip-on-module package, SOC (System On a Chip), or the like.

Also, the control unit 10 may include built-in RAM, ROM, flash memory, or the like.

[Functional Configuration of Print Server 1]

Here, with reference to FIG. 3, the functional configuration of the print server 1 is described.

The control unit 10 of the print server 1 includes a condition setting unit 100, a condition sharing unit 110, a job acquiring unit 120, and a job processing unit 130.

The storage unit 19 stores a grouping condition 200, a job 210, and a group job 220.

The condition setting unit 100 sets grouping conditions 200 for grouping the jobs 210. Here, the condition setting unit 100 sets a condition under which the jobs 210 can be collectively processed based on the setting and the information about the component apparatuses stored in the storage unit 19, or the like.

Specifically, the condition setting unit 100 can set, as the grouping conditions 200, conditions related to paper, color printing, finishing, roll paper, or ganging.

The condition sharing unit 110 shares the grouping conditions 200 set by the condition setting unit 100 with the other print server.

Here, when the grouping condition 200 is changed, the condition sharing unit 110 can transmit the change to the other print server.

The job acquiring unit 120 acquires a plurality of the jobs 210 that meet the grouping conditions 200 from the other print server and stores them in the storage unit 19 as group jobs 220.

At this time, the job processing unit 130 can add the ID 300 corresponding to each of the plurality of jobs 210 acquired by the job acquiring unit 120 when collecting them.

The job processing unit 130 groups a plurality of jobs 210 acquired by the job acquiring unit 120 and processes them as group jobs 220.

Here, the job processing unit 130 can add the ID 300 corresponding to each job 210 to the register mark area or the banner pages and print them.

The grouping condition 200 is a condition for grouping jobs 210 having the same printing material setting and color setting. The grouping condition 200 enables to minimize the number of changing of a printing material set such as paper, or the like, the number of setting changes of color, and the like.

In the present embodiment, as the grouping condition 200, an example of setting conditions for grouping by designating paper, color printing, and finishing process, grouping for roll paper printing, and grouping for ganging printing is described. Among these, in the grouping for roll paper printing, jobs 210 for one roll are grouped together for printing by a continuous length printer. In the grouping for ganging printing, jobs 210 that match the settings for ganging printing can be group. Here, ganging printing is a printing method that printing matters of different pictorial patterns and sizes together as one plate.

Specifically, among the grouping conditions 200, in grouping by designating paper, color printing, and finishing process, a print execution (release) condition when the number of papers set in the paper feed tray or when a specific work time is come is set.

More specifically, for example, the following conditions are set.

Job group name: Group-001
Paper size: SRA3
Paper type: Coated paper, 120 gsm
Color: Color printing
Finishing process: Saddle stitching
Release condition: When jobs for 2000 sheets is collected, or when it is at 14:00 on 6/3/2022

Also, in the grouping for roll paper printing, a print execution (release) condition when one roll of the jobs 210 is collected is set.

More specifically, for example, the following conditions are set.

Job group name: Group-002
Paper size: A4
Paper Type: Fine paper, 90 gsm
Color: Monochrome printing
Finishing process: n/a
Release condition: When 500 jobs are collected Also, in the grouping for ganging printing, a print execution (release) condition when a specific amount of combinations of the jobs 210 with different paper sizes are collected is set.

More specifically, for example, the following conditions are set.

Job 210 group name: Group-003
Paper size: B4 or B5
Paper type: Matte coated paper, 150 gsm
Color: Color printing
Finishing process: n/a
Release condition: 100 or more B4 jobs, and 70 or more B5 jobs are collected In addition, the grouping condition 200 may be set with information such as the classification of the other print servers that can be acquired, the ID 300 of the job 210, the user's security scope and operation authority, and the like.

The job 210 is data in which various data used at the time of printing in production printing are put together. For example, the job 210 may be described in JDF (Job Description Format) and/or JMF (Job Messaging Format).

In this embodiment, an example that the job 210 is data transmitted from the other print server and grouped and is mainly used in the printing process and the post-processing process is described.

In addition, in this embodiment, an ID 300 is set for job 210.

The ID 300 is a management ID (Identification) for distinguishing the job 210 managed by the other print server.

The ID 300 may be configured to include with, for example, an ID indicating each print server 1 of the industrial printing system X and an ID indicating each job 210 (job ID).

Further, ID 300 may include data such as URL (Uniform Resource Locators), IP address, or the like, for the other print server.

Furthermore, the job 210 includes job information, job ticket, print data, print resource, and the like.

The job information is data including print processing attributes. In the job information, the type of job 210, the name of the job 210, the name of the project (order), the reserved printing apparatus 2, the number of copies, the presence or absence of collation, the presence or absence of recording, the cutting mm, the print direction, the print state, the priority, or the like, are set.

The job ticket is setting data for requesting the job 210. This request includes necessary settings including sub-settings in the workflow that are order settings, such as imposition positions and post-processing. In the present embodiment, the job ticket may be generated from a workflow template for printing as respond to the order. Further, the job ticket may also be written in JDF and/or JMF.

The print data is data of a print manuscript in which a design is set according to an order. The print data may be, for example, electronic document data such as PDF (Portable Document Format), or the like, PS (Post Script) data, the other vector data, a format data for document submission, the other raster image data, and the like.

The print resource is information on various resources necessary for printing instructions such as an ICC profile, or the like. The other resource data required for printing are also included in the print resource.

In addition, job 210 may include processing change information. The processing change information may include information indicating if the job 210 has been changed or replaced by the other print server.

In addition, the processing change information may include, for example, information such as correction details when there is a delay in each print server 1, which includes the originated print server, and changes in processing results in printing. The content of this correction includes, for example, a change in the number of copies or pages, an alternate profile, correction of imposition position, correction of milling designation, correction of cutting width, and the like.

Furthermore, the job 210 may include image data that has been performed raster image processor (hereinafter abbreviated as "RIP") by offset printing based on the job ticket. This image data may be, for example, TIFF or other bitmap data. Additionally, the image data may be lossless or lossy compressed.

The group job 220 is a job collected by grouping a plurality of jobs 210 by the job processing unit 130.

Further, the group job 220 may be set with status, component apparatus information, and the like. Among these, the status may include grouping status information indicating how many and what attributes of the jobs 210 have been collected from other print server(s). These attributes include attributes related to the grouping condition 200. Furthermore, the status may include progress information of processing after printing has been executed (released). This progress information may be managed for each job 210. The component apparatus information includes information on the functions and settings of each component apparatus for printing and post-processing, information on the operating status, and the like.

Here, the control unit 10 of the print server 1 functions as the condition setting unit 100, the condition sharing unit 110, the job acquiring unit 120, and the job processing unit 130 by executing the control program stored in the storage unit 19.

Also, each unit of the print server 1 described above is a hardware resource that executes the grouping process method of the present disclosure.

In addition, a part or any combination of the functional configurations described above may be configured in terms of hardware or circuit by using an IC, programmable logic, FPGA (Field-Programmable Gate Array), or the like.

[Distributed Grouping Process by Print Server 1]

Figure 4:
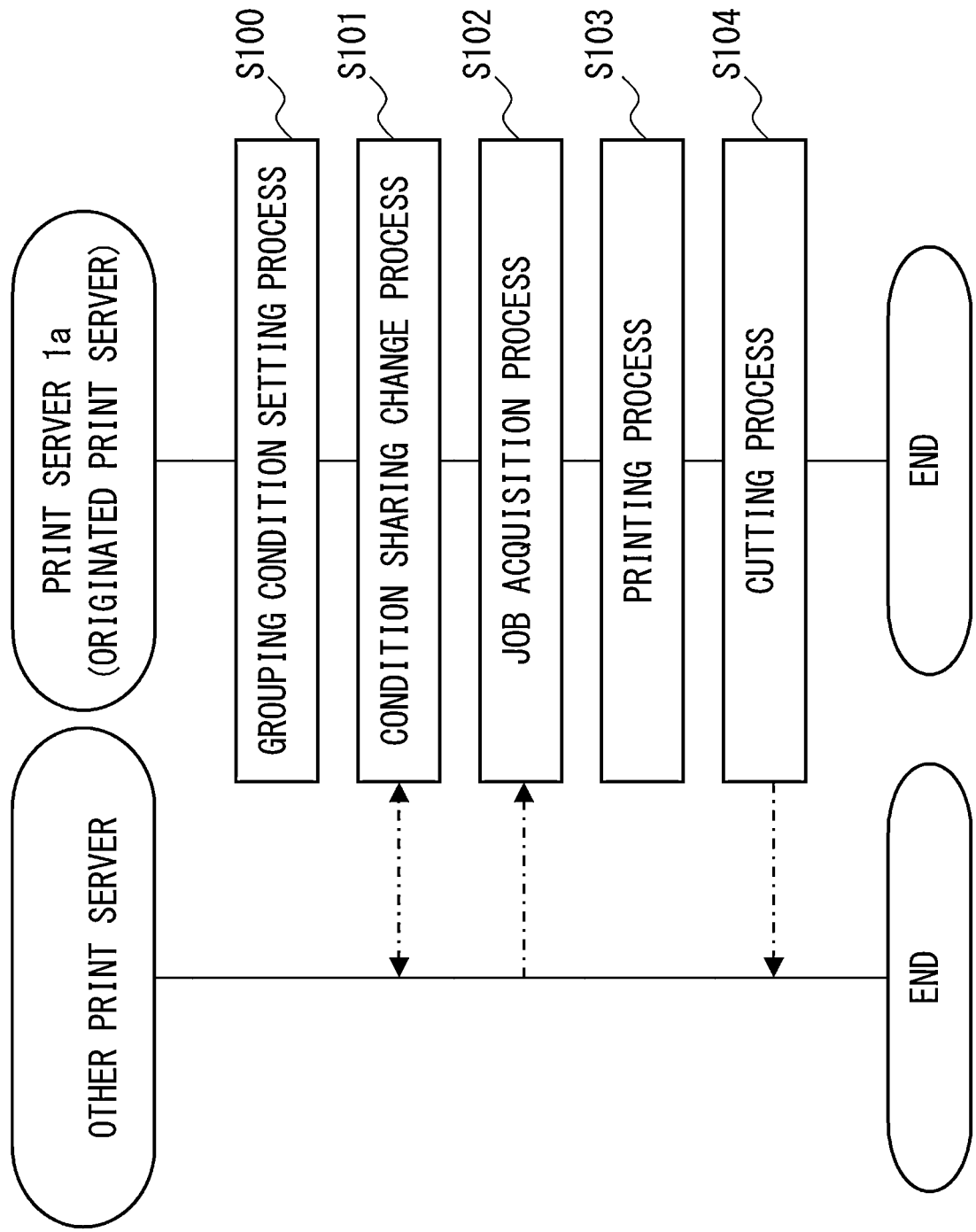
FIG. 4 is a flowchart of distributed grouping process according to an embodiment of the present disclosure.
Figure 5:
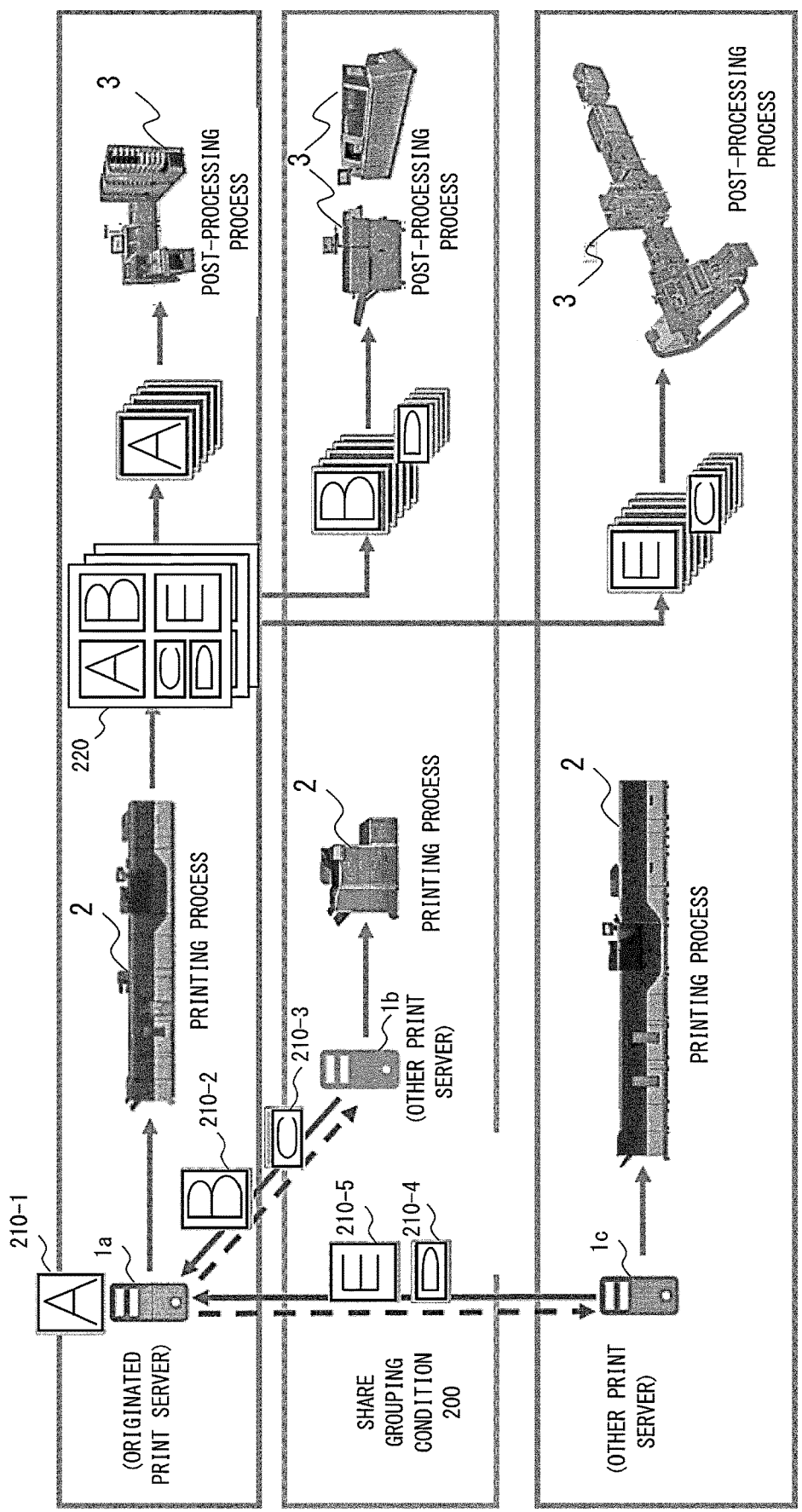
FIG. 5 is a conceptual diagram of the distributed grouping process as shown in FIG. 4.

Next, with reference to FIGS. 4 and 5, a distributed grouping process by the print server 1 according to the embodiment of the present disclosure is described. This distributed grouping process is an example to perform the grouping process method according to the present embodiment.

In the distributed grouping process according to the present embodiment, a grouping condition 200 for grouping jobs 210 is set in the originated print server. Then, the set grouping condition 200 is shared with the other print server. Then, a plurality of jobs 210 that meet the grouping conditions 200 are obtained from the other print server. Then, the plurality of acquired jobs 210 are grouped and processed.

In the distributed grouping process according to the present embodiment, an example for explanation, the print server 1*a* of the printing company A (site) in FIG. 1 is assumed to be the originated print server (grouping request side). The print server 1*b* of printing company B (site) and the print server 1*c* of printing company C (site) are the other print servers (transmitting side of job 210), respectively.

In the distributed grouping process according to the present embodiment, an example that the control unit 10 of the print server 1*a*, which is the originated print server, executes the program stored in the storage unit 19 in cooperation with each unit by using hardware resources is described.

In the following, with reference to the flowchart of FIG. 4, details of the distributed grouping process are described step by step.

(Step S100)

Firstly, the condition setting unit 100 performs grouping condition setting process.

The condition setting unit 100 sets grouping conditions 200 for grouping jobs 210. Specifically, the condition setting unit 100 sets a condition related to paper, color printing, finishing, roll paper, or ganging as the grouping condition 200 and stores it in the storage unit 19.

In the present embodiment, the condition setting unit 100 can allow a user such as an administrator of the originated print server to set the grouping condition 200 for executing the job 210. At this time, the condition setting unit 100 may allow the user to set the grouping condition 200 by using a dedicated application for the order management with GUI (Graphical User Interface), or the like. At this time, a template, or the like, may be used.

In the example according to the present embodiment, as described above, the print server 1*a* that sets this grouping condition 200 is the originated print server (print server 1 on the job request side).

Furthermore, the condition setting unit 100 can determine whether grouping of the job 210 can be processed at the site based on information on operable component apparatuses and other management-related information, and it automatically set the grouping conditions 200. Specifically, the condition setting unit 100 determines whether the printing apparatus 2 capable of processing in the printing process is included or the post-processing apparatus capable of post-processing in the post-processing process is included if the grouping condition 200 is set. Furthermore, the condition setting unit 100 may determine whether the grouping condition 200 is such that a grouping request is likely to be made, that is, the job 210 is likely to be acquired from the other print server.

The condition setting unit 100 can also present the results of these determinations to the user via the GUI so that the user can change the results.

(Step S101)

Then, the condition sharing unit 110 performs condition sharing change process.

The condition sharing unit 110 shares the grouping conditions 200 set by the condition setting unit 100 with other print servers. Specifically, the condition sharing unit 110 shares the grouping condition 200 among the print servers 1 that are peer-to-peer connected.

In the present embodiment, for example, the condition sharing unit 110 transmits the set grouping condition 200 to other print servers at each site that are peer-to-peer connected and capable of cooperation. Other print servers that have received the grouping condition 200 stores it in the storage unit 19 in association with the group name of the job 210.

FIG. 5 shows an example in which grouping conditions 200 are shared in this way.

According to this example, in the present embodiment, as indicated by the dark dotted line in FIG. 5, the condition sharing unit 110 of the print server 1a, which is the originated print server, transmits and shares the grouping conditions 200 with the print server 1b and the print server 1c.

However, the print server 1b and the print server 1c can similarly transmit the grouping condition 200 to the print server 1a and share it.

Additionally, when the grouping condition 200 is changed, the condition sharing unit 110 can also transmit the change to other print servers. At this time, the condition sharing unit 110 can also transmit only the change information of this grouping condition 200.

(Step S102)

Next, the job acquiring unit 120 performs job acquisition process.

The job acquiring unit 120 acquires a plurality of jobs 210 that meet the grouping conditions 200 from other print servers.

Here, other print server that has acquired the grouping condition 200 determines a processing requirement, which is the requirement that needs to be processed in the printing process, from the job information, job ticket, print data, print resources, or the like, included in the job 210. Then, other print server sends the job 210 whose the processing requirements meets the grouping conditions 200 to the originated print server.

At this time, the other print server adds a management ID 300 (job ID) for tracking (confirming) the status of the job 210 and transmits it. This job 210 may be generated to include a job ticket having print processing settings for each page. At this time, the other print server can encrypt the job 210 and send it to the originated print server.

According to FIG. 5, in the present embodiment, as indicated by dark black lines, the jobs 210-2 and 210-3 are sent from the print server 1b, which are the other print server, to the print server 1a, which is the originated print server. Similarly, the jobs 210-4 and 210-5 are sent are sent from the print server 1c, which are the other print server, to the print server 1a, which is the originated print server.

On the other hand, the print server 1a holds the job 210-1.

The job acquiring unit 120 acquires the job 210 to be subjected to peer-to-peer distributed processing from the other print server and stores it in the storage unit 19.

After that, the job acquiring unit 120 of the originated print server also responds the management ID 300 (job ID) to the other print servers.

Further, the job acquiring unit 120 that has acquired the job 210 sets the grouping state information in the status of the group job 220. The grouping state information may include information such as the number and attribute of jobs 210, the fill rate, the remaining time until the release condition is met, or the like.

The job acquiring unit 120 transmits this status to the other print server. As a result, the other print server can check the status related to the job 210 sent to the originated print server.

Here, the other print server can change, cancel, or the like, the job 210 sent to the originated print server.

In this case, for example, the other print server can send the changed job 210 to the originated print server again and replace it with the change target job 210 at the originated print server. At this time, the management ID 300 of the replaced job 210 may remain unchanged or may be changed and version managed.

Further, if the grouping condition 200 is not met due to a change in the other print server, the other print server can send a cancellation notification of the target job 210 to the originated print server as change information.

On the other hand, the job processing unit 130 can also adjust acquisition of the job 210 based on the status of the grouping condition 200.

Specifically, the job processing unit 130 refers to the processing status of the group job 220 and may cancel the job 210 if the fill rate or remaining time exceeds the allowable range based on the grouping state information. In this case, the condition sharing unit 110 may transmit the change information to the other print server.

Alternatively, if the printing process as described later has been started but the fill rate, or the like, is still low, the job acquiring unit 120 may temporarily stop printing at a paper break, or the like. At this time, it is possible to wait until the jobs 210 are collected. Furthermore, in this case as well, the condition sharing unit 110 may be caused to transmit change information.

(Step S103)

Then, the job processing unit 130 performs printing process.

The job processing unit 130 groups the plurality of jobs 210 acquired by the job acquiring unit 120 and stores it in the storage unit 19 as the group job 220.

The job processing unit 130 starts printing process for the group job 220 when the release condition in the grouping condition 200 is satisfied.

At this time, the job processing unit 130 adds the IDs 300 corresponding to each of the plurality of jobs 210 acquired by the job acquiring unit 120 to the group job 220. At this time, the job processing unit 130 adds an ID 300 (job ID) to the registration mark area, the banner page, or the like.

In the example of FIG. 5, the group job 220 in which the jobs 210-1 to 210-5 are grouped is printed. The job processing unit 130 instructs the selected printing apparatus 2 to print. As a result, the printing apparatus 2 can output for printing based on the group job 220.

Here, the job processing unit 130 can record the progress of processing of the group job 220 in the status of the group job 220 and share it with the other print servers. Thereby, the progress (delay) status of the set processing can be shared.

(Step S104)

Then, the job processing unit 130 performs cutting process.

After the printing of the group job 220 is completed, the job processing unit 130 causes the post-processing apparatus 3 to perform post-processing. In the present embodiment, printed matter is cut for each job 210.

At this time, the job processing unit 130 may collect the printed matters that have been cut by the post-processing apparatus 3 based on the ID 300 added to the registration mark area or the banner page.

Also, the collected printed matters may be automatically transported to each site by the shipping server 4.

As a result, the grouped printed matters can be acquired and used at each site.

With the above, the distributed grouping process according to the embodiment of the present disclosure completes.

As configured as described above, the following effects can be obtained.

In typical production printing, for the purpose of efficiently processing a large number of print jobs, grouping is sometimes performed to collectively process a plurality of jobs such as the same print instruction.

With the grouping, it is possible to minimize setting changes during printing, such as paper setting changes, or the like, so that printing work can be made more efficient.

Also, in a production printing business in which a large amount of printing is performed, print processing may be performed by a plurality of printing apparatuses. In this case, it is necessary to build a system by using a management server that manages the job 210.

Here, typical grouping can only be processed by using such management server. For this reason, it has not been considered that the jobs 210 are obtained by peer-to-peer from other print servers at other sites and grouped.

On the other hand, the industrial printing system X according to the present embodiment is an industrial printing system for production printing having a plurality of print servers 1 that performs distributed processing of jobs 210, each of the plurality of print servers 1 includes: a condition setting unit 100 that sets a grouping condition 200 for grouping the jobs 210; a condition sharing unit 110 that shares the grouping condition 200 set by the condition setting unit 100 with other print server; a job acquiring unit 120 that acquires a plurality of jobs 210 that meets the grouping condition 200 from the other print server(s); and a job processing unit 130 that groups and processes the plurality of jobs 210 acquired by the job acquiring unit 120.

With such a configuration, the industrial printing system that eliminates the need for a management server and enables flexible peer-to-peer grouping between print servers 1 can be provided. That is, in the industrial printing system X according to the present embodiment, there is no need to separately prepare a special management server.

As a result, work efficiency with the group job 220 even in collaboration with other sites can be improved. Therefore, the output of the job 210 can be made more efficient with greater extent than the typical grouping, and the cost and labor can be reduced.

In the industrial printing system X according to the present embodiment, the condition setting unit 100 sets a condition related to paper, color printing, finishing, roll paper, or ganging as the grouping condition 200.

By configuring in this manner, grouping for jobs 210 common to paper, color printing, or finishing, grouping for roll paper, and grouping for ganging can be used, properly. Therefore, the jobs 210 that meet the grouping conditions 200 from other print servers can be easier to acquire, and efficiency can be improved.

In the industrial printing system X according to the present embodiment, the job processing unit 130 processes by adding an ID 300 corresponding to each of the plurality of jobs 210 acquired by the job acquiring unit 120 when grouping.

By configuring in this manner, each of the grouped jobs 210 is performed the printing process with adding the ID 300, and the occurrence of a mix-up when the printed matter of the group job 220 are cut, or the like, can be prevented. Therefore, the user's trouble can be reduced.

In the industrial printing system X according to the present embodiment, the job processing unit 130 adds the ID 300 to a registration mark area or a banner page.

By configuring in this way, it is possible to prevent extra information from being added to the printed matter and to process the cut printed matter in the same manner as the normal printing.

In the industrial printing system X according to the present embodiment, the condition sharing unit 110, when the grouping condition 200 is changed, send the change to the other print server.

By configuring in this way, when the grouping condition 200 is changed due to the convenience of the originated print server, or the like, the other print server at the other site can also grasp it. As a result, labor in collaboration between printing companies can be reduced.

Other Embodiments

In addition, in the above-described embodiment, an example has been described in which the other print server determines the grouping condition 200 set by the originated print server and then transmits the job 210.

However, a configuration is also possible in which the originated print server accesses the other print server, determines whether the job 210 can be processed from the processing requirements of the job 210, and acquires this job 210 from the other print server. In this case, the originated print server may determine from the grouping conditions 200 stored in its own storage unit 19 whether the job 210 existing in the other print server can be processed.

With this configuration, whether the job 210 is possible to be processed or not without sending the grouping condition 200 to the other print server can be determined. In such case, by negotiating with other print servers, the jobs 210 can be grouped and processed more efficiently.

Even in such configuration, the grouping condition 200 between the originated print server and other print server can be shared so that the job 210 is to be accommodated, transmitted, and received each other.

Further, in the above embodiment, an example of grouping the print jobs 210 has been described. However, post-processing jobs 210 can also be grouped. In this case, the ID 300 may be printed by the printing apparatus 2 in the other print server before grouping for post-processing.

Furthermore, the print server 1 (group) that determines the printing process and the post-processing process may be different.

Further, one of the other print servers may be processed both the job 210 of the print job and the job 210 of the post-processing job.

In addition, priority may be given as to which print server 1 becomes the other print server. This priority may be set based on the number of vacancies according to the status of the grouping condition 200, the number and performance of component apparatuses, cost, and other information.

By configuring in this way, the job 210 can be more efficiently distributed and processed to each site.

Also, in the above-described embodiment, the job 210 is obtained with a single grouping condition 200.

However, jobs 210 may be obtained according to a plurality of different grouping conditions 200.

With this configuration, more appropriate grouping from the other print servers can be performed. Moreover, the group job 220 grouped can be changed or adjusted due to delay, or the like. As a result, the time and effort of manual adjustment can be reduced, the efficiency of processing the job 210 can be improved, and the running cost can be reduced.

Furthermore, the group job 220 may include data and databases of scheduling information and acquiring status information, or the like, that is updating in real time for each job 210. This scheduling may be viewable from the other print servers, or it may be viewable according to information such as the user's security scope and operational authority set in the grouping condition 200. In this case, the scheduling information may include the expired date for the processing requirement, the progress (delay) status of printing or post-processing within the group job 220, or the like, as the status of the job 210.

By configuring in this way, the grouping based on the schedule can be performed. In this case, as described above, by acquiring jobs 210 according to a plurality of different grouping conditions 200, more appropriate scheduling becomes possible.

Also, in the above-described embodiment, an example of leaving the job 210 sent to the other print server as it is has been described.

However, the job processing unit 130 can also send a command, or the like, to delete the job 210 from the other print server after printing and cutting are completed.

Also, the processed job 210 may be sent again to the other print server. Further, after the printing process is completed, the other print server may directly transmit the job 210 to a print server other than the one processed. As a result, the job 210 may be referred for the post-processing of the printed matter and for subsequent reference.

With this configuration, the job 210 can be processed more appropriately.

Further, in the above-described embodiment, an example of transmitting the job 210 as it is to the originated print server has been described.

However, it is also possible to change the job 210 itself according to the grouping condition 200 and its change, or the like. In this case, when adjusting acquisition of the job 210, for example, it is possible to make the job 210 processable by changing the number of pages, the color profile to be used, and the like.

Alternatively, the job 210 itself can be divided, and the divided jobs 210 can be send, separately, to originated print servers that meet the grouping conditions 200 by peer-to-peer.

As such configuration, more efficient grouping of the jobs 210 can be performed.

Also, as described above, when the acquisition of the job 210 is adjusted, the change information may be recorded in the job 210 itself, and the changed job 210 may be acquired at the originated print server. Furthermore, the job 210 can also include image data performed RIP by the other print server.

As a result, the same output, or the like, can be performed even if retransmitting to an originated print server different from the requested one.

Further, the configuration and operation of the above-described embodiment are examples, and needless to say, they can be modified and executed as appropriate without departing from the aim of the present disclosure.

What is claimed is:

1. An industrial printing system for production printing having a plurality of print servers that performs distributed processing of jobs, each of the plurality of print servers comprising:
 a condition setting unit configured to set a grouping condition for grouping the jobs;
 a condition sharing unit configured to share the grouping condition set by the condition setting unit with another print server;
 a job acquiring unit configured to acquire a plurality of jobs that meets the grouping condition from the other print server; and
 a job processing unit configured to group and print, with a grouped state, the plurality of jobs acquired by the job acquiring unit; wherein
 each of the plurality of jobs is determined to meet the grouping condition that is shared with the other print server;
 the condition setting unit sets a condition related to paper, color printing, finishing, roll paper, or ganging as the grouping condition, and, for each condition, further sets a release condition to execute printing; and
 in the grouping by paper, color printing, and finishing, a release condition is set to execute printing when the plurality of jobs is acquired for a number of papers set in a paper feeding tray or at a specific time is come.

2. The industrial printing system according to claim 1, wherein:
 in the grouping of ganging, a release condition is set to execute printing when a specific amount of combinations of the plurality of jobs with different paper sizes is collected; and
 in the grouping of roll paper, a release condition is set to execute printing when the plurality of jobs for one roll is acquired.

3. The industrial printing system according to claim 1, wherein:
 the job processing unit processes by adding an ID corresponding to each of the plurality of jobs acquired by the job acquiring unit when grouping; wherein:
 the system comprises a post-processing apparatus is configured to cut printed matter for each job; and
 the job processing unit is configured to collect the printed matter that has been cut by the post-processing apparatus based on the ID.

4. The industrial printing system according to claim 3, wherein:
 the job processing unit adds the ID that corresponds to each of the plurality of acquired jobs to a register mark area or a banner page.

5. The industrial printing system according to claim 1, wherein:
 the condition sharing unit, when the grouping condition is changed, sends the change to the other print servers of the plurality of print servers and shares the change with the other print servers of the plurality of print servers.

6. The industrial printing system according to claim 1, wherein:
 the job acquiring unit acquires a job from the other print server, wherein requirements for processing the job in the printing process meet the grouping condition, wherein the grouping condition has been determined by the other print server from job information, a job ticket, print data, or print resources.

7. The industrial printing system according to claim 1, wherein:
 the condition setting unit determines whether grouping of the job is processable or not at the site based on information on operable component apparatuses and other management-related information and sets determination to the grouping condition.

8. The industrial printing system according to claim 1, wherein:
 when fill rate or remaining time exceeds allowable range based on grouping state information, the job is canceled and change information is sent to the other print server.

9. The industrial printing system according to claim 1, wherein the plurality of acquired jobs comprises only jobs determined to meet the grouping condition.

10. A print server that performs distributed processing of jobs in an industrial printing system for production printing, comprising:
 a condition setting unit configured to set a grouping condition for grouping the jobs;

a condition sharing unit configured to share the grouping condition set by the condition setting unit with another print server;

a job acquiring unit configured to acquire a plurality of jobs that meets the grouping condition from the other print server; and a job processing unit configured to group and print, with a group state, the plurality of jobs acquired by the job acquiring unit; wherein each of the plurality of jobs is determined to meet the grouping condition that is shared with the other print server;

the condition setting unit sets a condition related to paper, color printing, finishing, roll paper, or ganging as the grouping condition, and, for each condition, further sets a release condition to execute printing; and in the grouping by paper, color printing, and finishing, a release condition is set to execute printing when the plurality of jobs is acquired for a number of papers set in a paper feeding tray or at a specific time is come.

11. The print server according to claim 10, wherein:

in the grouping of ganging, a release condition is set to execute printing when a specific amount of combinations of the plurality of jobs with different paper sizes is collected; and in the grouping of roll paper, a release condition is set to execute printing when the plurality of jobs for one roll is acquired.

12. The print server according to claim 10, wherein:

the job processing unit processes by adding an ID corresponding to each of the plurality of jobs acquired by the job acquiring unit when grouping, wherein the ID is to printed for collecting cut printed matter by a post-processing apparatus.

13. The print server according to claim 12, wherein:

the job processing unit adds the ID that corresponds to each of the plurality of acquired jobs to a register mark area or a banner page.

14. The print server according to claim 10, wherein:

the condition sharing unit, when the grouping condition is changed, sends the change to the other print servers of the plurality of print servers and shares the change with the other print servers of the plurality of print servers.

15. The print server according to claim 10, wherein the plurality of acquired jobs comprises only jobs determined to meet the grouping condition.

16. A grouping process method performed by an industrial printing system for production printing, having a plurality of print servers for distributed processing of jobs, comprising the steps of:

setting a grouping condition for grouping the jobs;

sharing the set grouping condition with another print server;

acquiring a plurality of jobs that meets the grouping condition from the other print server; and grouping and printing, with a grouped state, the acquired plurality of jobs; wherein each of the plurality of jobs is determined to meet the grouping condition that is shared with the other print server;

the step of setting a grouping condition comprises setting a condition related to paper, color printing, finishing, roll paper, or ganging as the grouping condition and, for each condition, setting a release condition to execute printing and the setting a release condition to execute printing comprises setting, in the grouping by paper, color printing, and finishing, a release condition to execute printing when the plurality of jobs is acquired for a number of papers set in a paper feeding tray or at a specific time is come.

17. The grouping process method according to claim 16, wherein:

the setting a release condition to execute printing comprises setting, in the grouping of ganging, a release condition is set to execute printing when a specific amount of combinations of the plurality of jobs with different paper sizes is collected; and the setting a release condition to execute printing comprises setting, in the grouping of roll paper, a release condition is set to execute printing when the plurality of jobs for one roll is acquired.

18. The grouping process method according to claim 16, further comprising:

processing by adding an ID corresponding to each of the plurality of jobs that is acquired when grouping, wherein the ID is to printed for collecting cut printed matter by a post-processing apparatus.

19. The grouping process method according to claim 18, further comprising:

adding the ID that corresponds to each of the plurality of acquired jobs to a register mark area or a banner page.

20. The grouping process method according to claim 16, further comprising:

sending, when the grouping condition is changed, the change to the other print servers of the plurality of print servers and sharing the change with the other print servers of the plurality of print servers.

* * * * *